(12) United States Patent
Mckinstry et al.

(10) Patent No.: US 7,986,485 B2
(45) Date of Patent: Jul. 26, 2011

(54) SERVO WRITER PROVIDING A PRE-WRITING, LONGITUDINAL MAGNETIC BIAS IN A MAGNETICALLY UNORIENTED TAPE SUPPLY

(75) Inventors: Kevin D. Mckinstry, Denver, CO (US); Steven G. Trabert, Boulder, CO (US); Steven M. Kientz, Westminster, CO (US)

(73) Assignee: Oracle America, Inc., Redwood City, CA (US)

( * ) Notice: Subject to any disclaimer, the term of this patent is extended or adjusted under 35 U.S.C. 154(b) by 22 days.

(21) Appl. No.: 12/414,954

(22) Filed: Mar. 31, 2009

(65) Prior Publication Data

US 2010/0246057 A1 Sep. 30, 2010

(51) Int. Cl.
G11B 21/02 (2006.01)
G11B 5/03 (2006.01)
G11B 5/584 (2006.01)

(52) U.S. Cl. .................. 360/75; 360/66; 360/77.12
(58) Field of Classification Search .................. None
See application file for complete search history.

(56) References Cited

U.S. PATENT DOCUMENTS

| | | | |
|---|---|---|---|
| 3,548,113 A * | 12/1970 | Althuber | 360/66 |
| 4,177,442 A * | 12/1979 | Bate et al. | 335/284 |
| 4,440,106 A * | 4/1984 | Greiner et al. | 118/640 |
| 4,466,027 A | 8/1984 | Howell et al. | |
| 5,132,860 A | 7/1992 | Von Stein | |
| 5,420,742 A * | 5/1995 | Ketcham et al. | 361/151 |
| 5,979,774 A * | 11/1999 | Urushibata | 235/493 |
| 6,462,904 B1 | 10/2002 | Albrecht et al. | |
| 7,012,774 B2 | 3/2006 | Nakao et al. | |
| 7,203,026 B2 | 4/2007 | Horimai | |
| 7,283,317 B2 | 10/2007 | Dugas et al. | |
| 2008/0304180 A1* | 12/2008 | Schaefer et al. | 360/134 |

* cited by examiner

Primary Examiner — Andrew L Sniezek
(74) Attorney, Agent, or Firm — Marsh Fischmann & Breyfogle LLP; Kent A. Lembke; Per H. Larsen (57) ABSTRACT

A servo writing method is provided for use with unoriented magnetic tape media. A biasing zone is formed, such as between a pair of permanent block or disk magnets, with a strong DC magnetic field that is substantially free of perpendicular components. The method includes feeding the tape through the magnetic biasing zone to form a longitudinal magnetic bias in the magnetic layer of the tape media. The method includes using a write head to write a servo pattern on the tape media after the forming of the longitudinal magnetic bias in the tape media, and the servo pattern produces an output that is substantially symmetric with high amplitudes. In one embodiment, the biasing zone is formed or defined as the gap between first and second magnetic assemblies oriented with a single direction of magnetization, such as in the same direction as the tape travel through the biasing zone.

12 Claims, 10 Drawing Sheets

SERVO WRITER PROVIDING A PRE-WRITING, LONGITUDINAL MAGNETIC BIAS IN A MAGNETICALLY UNORIENTED TAPE SUPPLY

BACKGROUND OF THE INVENTION

1. Field of the Invention

The present invention relates, in general, to magnetic tape media used for data storage and manufacture of magnetic tape, and, more particularly, to tape manufacturing methods and systems, such as servo writers, that are useful in producing high quality magnetic tape including written servo patterns using a supply or feed of magnetically unoriented tape media.

2. Relevant Background

Magnetic tape has been used for data storage for many years. Modern usage typically involves magnetic tape that is packaged in cartridges or cassettes being used for backups and archives. In part, this use has evolved because when storing large amounts of data, tape can be substantially less expensive than disk or other data storage options. The device that performs the actual writing and reading of data is a tape drive, and autoloaders and tape libraries are often used to automate cartridge handling. Magnetic tape allows massive amounts of data to be stored for long periods of time while providing relatively rapid access to archived data.

Magnetic tape is a medium for magnetic recording that is made up of a thin magnetizable coating on a long and narrow strip of plastic (e.g., PET, PEN, or the like) or other substrate material. For example, the magnetic media coating may be composed of up to 50 percent or more of magnetic particles by volume, a polymer binder, and small amounts of cross-linking agents, dispersants, and lubricants. With advancements in tape formulations, coatings are becoming thinner and particles are becoming smaller to allow for higher linear density (e.g., bits per inch), which drives the need for new formulations and coating techniques. In the past, half-inch and other width magnetic tapes were fabricated with iron oxide being the magnetic particles but a switch was made to use chromium dioxide for these particles in the magnetic coating. More recently, tape formulations have made use of magnetic particle technology called Metal Particulate (MP) with MP providing a much higher coercivity (i.e., the ability to resist internal demagnetization) and smaller particle lengths. MP-based tapes provided more desirable signal-to-noise levels for higher density reading and writing on the magnetic tapes such that data capacities have grown up to 1 TB with some technologies anticipating capacities to grow to 3 TB or more per magnetic tape cartridge.

As part of manufacturing magnetic tape media, a servo pattern is written on the media prior to winding it into a shell or cartridge housing and later use in a tape drive to write and read data. The servo pattern may take numerous forms to suit a particular product type, but, in general, the servo pattern is used by the tape drive to ensure precise alignment between the drive head and the tape's data tracks. The servo patterns (or signals) may be written by a servo writer that uses a head or servo write head by recording a pattern into the tape. During use of the magnetic tape, the servo patterns are read by a magnetic head while the position of the magnetic head relative to the magnetic tape (e.g., the position along the width of the tape) is servo-controlled. To allow the drive and/or a servo signal sensing element to read the servo pattern or signal correctly, it is important for the pattern or sensed signal to provide a signal (e.g., a voltage signal) that has a relatively high amplitude (e.g., to maintain a desirable signal to noise (SN) ratio) and that is substantially symmetric.

Presently, tape media is magnetically oriented media. The media is typically comprised of acicular magnetic particles that are physically aligned in the downtrack direction of the tape during manufacturing. The acicular nature of the particles has a strong shape anisotropy that yields a large magnetic moment in the preferred direction of the shape of the particle (along the longest axis, for example). The intrinsic shape anisotropy coupled with the mechanical alignment of the particles creates an assembly of particles that do not have a significant magnetic component perpendicular to the surface of the tape or a perpendicular component. Prior to servo writing, the oriented media may be "erased" with AC degaussing techniques. Additionally, some media manufacturing processes utilize a DC erase head to apply a magnetic field to one side of the tape to DC erase the tape, e.g., to magnetize the magnet tape in one direction such as along the length of the tape. Specifically, forward magnetization assists in increasing the strength or amplitude when a servo pattern is later written to the oriented magnetic tape.

More recently, the data storage industry has been developing magnetic tape that is not magnetically oriented when manufactured (or is magnetically unoriented tape) in attempts to increase the capacity or areal density of tape-based storage products such as tape cartridges. Oriented tape has higher inherent noise due to the traditional shape anisotropy that could be addressed by use of AC erasing, and, in some cases, single-sided DC erasing to arrange the magnetic particles in a more uniform manner (such as with forward magnetization along the longitudinal axis of the tape) prior to servo writing so as to increase the amplitude of the read servo signals. Such techniques have not been useful with magnetic tape recording media that is randomly oriented because the media relies on crystalline anisotropy, rather than shape anisotropy for good recording characteristics. Randomly oriented media thus has the potential for significant perpendicular components to its magnetic fields (e.g., a magnetic component that out of the plane of tape or the tape thickness). Hence, existing processes involving AC or DC erasure have not been effective in producing media that can readily retain a servo pattern with high amplitude and acceptable symmetry.

Since the properties of the unoriented magnetic tape have caused difficulties in writing timing-based servo patterns that have high amplitude and low distortion, there remains a need for an enhanced method of writing good quality servo patterns on tape media in which the magnetic film or coating is not magnetically oriented as part of manufacturing. Preferably, such methods would be useful with existing servo writing processes, such as by implementation as a pre-servo writing stage or station within a servo writer.

SUMMARY OF THE INVENTION

Briefly, methods and devices are provided for creating a longitudinal magnetic bias in unoriented magnetic tape media. In one example, a pair of permanent magnets are provided as part of a magnetic biasing assembly and the magnetic tape media is passed through a gap (or biasing zone) between the magnets. The permanent magnets are arranged such that the direction of magnetization of each magnet is in the same direction (such as in the direction of tape travel), and a strong DC magnetic field is formed in the gap between the magnets that acts to provide biasing or a form of DC erasure with no or limited perpendicular components. Such a DC magnetic field with direction and strength along an axis of a passing tape may also be formed using combinations of permanent magnets, combinations of permanent magnets and blocks of soft magnetic material, and an electromagnet(s). Use of such a DC magnetic field on unoriented tape provides a desirable longitudinal bias in the magnetic layer of the tape, and servo patterns may then be successfully written on the tape to provide an output that has a high amplitude and symmetry.

More particularly, a servo writing method is provided for use with unoriented magnetic tape media. The method includes providing a supply of tape media comprising an unoriented magnetic layer or coating on a substrate. A biasing zone is defined or formed, and the biasing zone includes a DC magnetic field, such as a field that is substantially free of perpendicular components (relative to the path of the tape or out of the plane of the tape thickness or surfaces). The method includes feeding the tape through the magnetic biasing zone to form a longitudinal magnetic bias in the magnetic layer of the tape media. The method includes using a write head to write a servo pattern on the tape media after the forming of the longitudinal magnetic bias in the tape media. In the tape feeding, the DC magnetic field may have a direction that is substantially parallel to a longitudinal axis of the tape media, and the servo pattern written to the tape may produce an output that is substantially symmetric (and with high amplitude).

In one embodiment, the biasing zone is formed or defined as the gap or space between first and second magnetic assemblies, that are oriented with their direction of magnetization in a single direction (such as generally in the same direction as the tape travel through the biasing zone and, in some cases, parallel to the longitudinal axis of the tape in the biasing zone). The magnetic assemblies may include a permanent block magnet, and spaced apart sidewalls may define the biasing zone (e.g., with like poles of the block magnets being adjacent but spaced apart by the biasing zone). The magnetic assemblies may each further include a block of magnetically soft material, and these blocks may be paired to define a portion of the DC magnetic field proximate to an outlet of the biasing zone. In another embodiment, the biasing zone is defined by a center portion of a solenoid of an electromagnet (s), and the tape is fed through the solenoid such that its longitudinal axis is substantially parallel to the primarily longitudinal fields of the DC magnetic field.

DETAILED DESCRIPTION OF THE PREFERRED EMBODIMENTS

Briefly, embodiments of the present invention are directed to methods of creating or providing a longitudinal magnetic bias on unoriented magnetic tape media. In some embodiments, a magnetic biasing assembly or device is operated to provide a two-sided DC erasure of the tape media. The assembly is "two-sided" in the sense that top and bottom (or first and second opposing) magnets or magnets modules are used to perform the DC erasure. The top and bottom magnets/modules are spaced apart to form a biasing zone or space, and, during operation, unoriented tape is passed through the biasing zone/space between the top and bottom magnets/modules to provide a longitudinal magnetic bias on the tape. The top and bottom magnets/modules each provide a magnetic field that is in the same direction such as along the direction of the tape travel through the biasing zone. The terminal or exit portion of the biasing zone is of particular importance in achieving desired biasing (e.g., elimination or significant reduction of perpendicular components of the magnetic coating/layer of the unoriented tape), and embodiments of the biasing assembly may be adapted to provide more parallel field lines in this portion of the bias zone such as by providing an exit or trailing magnetic element with soft magnetic material, providing an electromagnet with tuned field strength, and so on.

When servo patterns are subsequently written upon the biased tape media, these servo patterns typically have high amplitudes and, significantly, signal symmetry (or substantially symmetric servo signals). The biasing methods and assemblies may be used to produce tape products, such as storage tape cartridges, with enhanced servo patterns, and such products are considered within the breadth of this description. Also, the biasing assemblies taught herein may be provided within a servo writer such as upstream of the servo write head, and servo writers including the biasing techniques described herein are considered within the breadth of this description.

Figure 1:
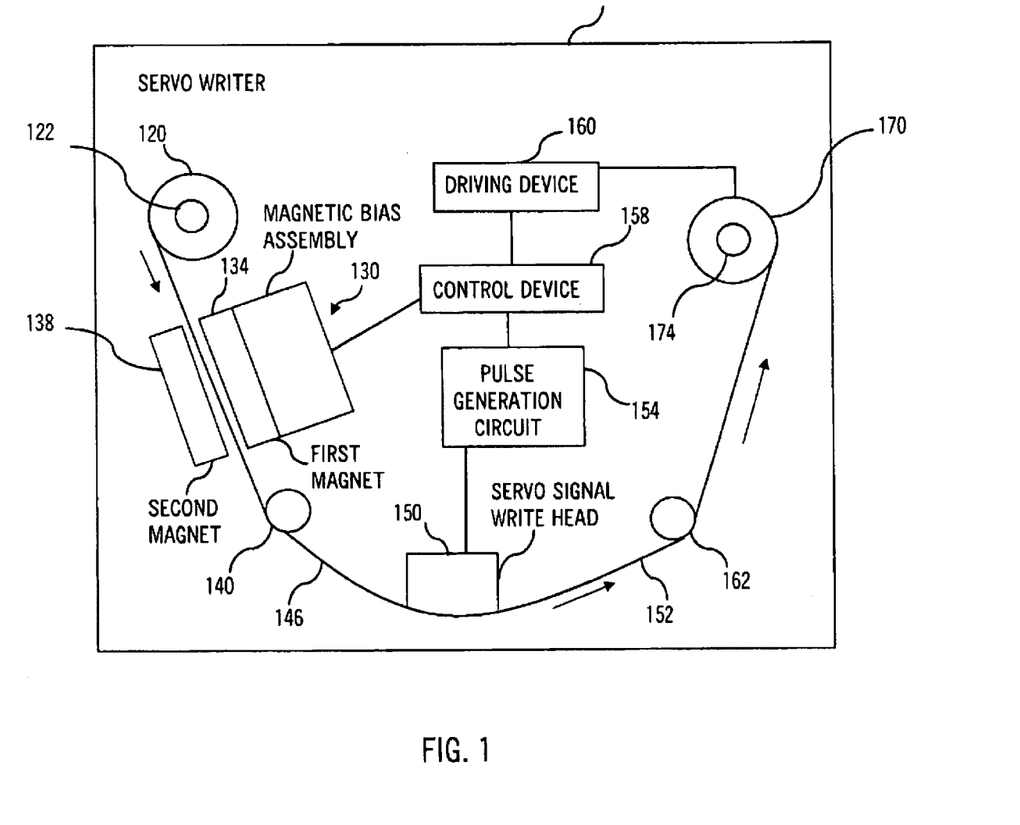
FIG. 1 illustrates a servo writer including a magnetic biasing assembly providing longitudinal magnetic biasing of unoriented magnetic media tape using DC erasure upstream or prior to servo pattern or signal writing.

FIG. 1 illustrates a servo writer 110 used in providing magnetic storage tape with a servo signal with high amplitude and symmetry by providing longitudinal magnetic bias on unoriented magnetic tape media (e.g., unoriented input or supply tape). As shown, the servo writer 110 includes supply tape 120 on supply or input reel 122, and the supply pancake or tape 120 is generally a magnetic storage tape media with a magnetic coating or layer upon a substrate. The magnetic coating or layer includes unoriented magnetic particles, and the substrate may widely vary to practice the invention (as may the tape thickness and width with 0.25-inch, 0.5-inch, and other widths being common). A driving device 160 rotatably operates the supply reel 122 and/or a take-up or output reel 174 (based on signals from control device 158) to cause the tape 120 to travel at predefined speeds (e.g., 4 to 16 meters/second or the like) through the servo writer 110 over guides 140, 162 to take-up reel 174 as servo written-tape or output tape 170. The servo writer 110 may also include a power source, a cleaning device for cleaning the magnetic tape 120, a verifying device for testing the written servo patterns downstream of the write head 150, and the like, which are not shown in FIG. 1. The supply tape 120 may have been formed by cutting an original web with unoriented magnetic coating into a product width but on which a servo pattern has not yet been written. In some cases, some magnetization may have been applied such as AC erasure, but this is not required to practice the invention. The supply tape 120 is often a large diameter reel or pancake of tape media that is placed on supply spindle 122.

During operation of the writer 110, the magnetic tape 120 is fed from the supply reel 122 into a magnetic biasing assembly 130 configured according to one of the embodiments described herein. Generally, the assembly 130 includes a first/top magnet (or magnet assembly/device) 134 and a second/bottom magnet (or magnet assembly/device) 138 that act in conjunction to use DC erasure to provide a longitudinal bias to the supply tape 120 as it is fed between the two magnets 134, 138. The magnets 134, 138 may be permanent magnets, magnetic devices with soft magnetic material(s), electromagnets, or some combination thereof to provide two magnetic fields that are in the same direction (such as substantially parallel to the travel path/direction of the tape 120 through the biasing assembly 130). The control device 158 (and a power source/circuit not shown) may be used to operate all or portions of the assembly 130 when electromagnetics are included in one or both magnets 134, 138 (such as by providing a biasing or DC erasure signal). As explained in detail below, the magnetic fields of the magnets 134, 138 (which may also be labeled opposing DC erase or biasing heads) preferably act to reduce or even substantially eliminate the perpendicular component of the magnetic layer/coating of the tape 120 as well as to provide a longitudinal bias to the magnetic particles. This may be achieved in part by providing particular magnetic conditions within a biasing zone between the two magnets 134, 138 and also at the outlet/exit of the assembly 130, which is not possible by using a single DC erasure magnet or device.

After being magnetically biased with assembly 130, the tape 146 is fed to or against the write head 150 that operates to write a servo pattern or signal onto the biased supply tape media 146. A pulse generation circuit 154 may be operated by control device 158 to supply a recording pulse current to the servo pattern write head 150. For example, but not as a limitation, the circuit 154 may repeat a pattern that a positive-polarity plus pulse current, zero current, plus pulse current, and zero current are generated and then subsequently no current for predetermined period based on a pulse control signal from the control device 158, whereby a recording pulse is generated. The write head 150 may take numerous forms to practice the invention, too, and it may include a coil operable by the recording pulse, which has a current large enough to magnetize the longitudinally biased magnetic layer of the tape 120. The servo pattern-written tape 152 is then fed over guide 162 onto the take-up reel 174 to form written or output tape 170, which then may be removed in a large diameter spool or pancake for use in fabricating tape cartridges or other tape-based storage products. Note, the magnetic biasing assembly 130 may also be provided in a separate device outside of the servo writer 110 and used to process the supply tape 120 prior to its being placed on spool 122 (e.g., the magnetic biasing may be performed at a variety of stations or times upstream or before the servo writing by head 150).

Figure 2:
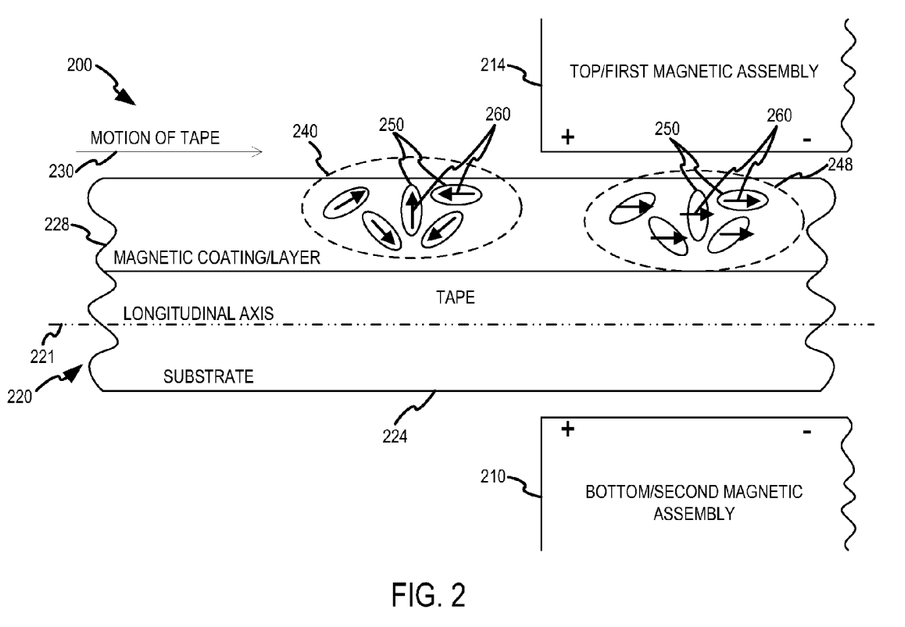
FIG. 2 illustrates operation of a magnetic biasing or bias assembly, such as the assembly shown in the servo writer in FIG. 1, to provide a longitudinal magnetic bias in unoriented tape including eliminating or at least reducing the perpendicular component of the field of the magnetic coating/layer.

FIG. 2 illustrates an enlarged, partial view of a magnetic biasing assembly 200 that may be used to create a longitudinal magnetic bias using DC erasure on unoriented magnetic tape media, e.g., an assembly that may used as the assembly 130 of servo writer 110 or the like. The inventors recognized that there are a number of problems associated with writing high amplitude, low distortion timing-based servo patterns on magnetic tape recording media that is not magnetically oriented when manufactured (e.g., prior to supply to a servo writer). To address these problems, the inventors determined that a high amplitude, low distortion servo pattern can be written on unoriented media by biasing the magnetic direction of the media in the longitudinal direction before writing timing-based servo patterns on the media.

A principle behind providing a longitudinally biased background magnetization on unoriented tape recording media is to apply a sufficiently strong DC magnetic field along the axis (e.g., longitudinal axis) of the tape. The DC field can be generated with permanent magnets, electromagnets, or a combination of electromagnets and permanent magnets (or a combination of varying strength, size, and/or shape permanent magnets) that are spaced apart a distance to defined a biasing zone through which the tape is forced to travel. Magnetically soft materials may also be used to further shape the magnetic field in the tape-containing region or biasing zone between the top/bottom or opposing magnets (e.g., initial biasing may be provided by permanent magnets in the top and bottom magnet assemblies and soft materials may be positioned proximate to the exit or outlet of the biasing zone to achieve a desired shape of the magnetic field so as to properly bias the tape).

FIG. 2 shows an assembly 200 that includes a top or first magnet assembly 214 and a spaced apart and opposing bottom or second magnet assembly 210. The assemblies 210, 214 are arranged such that the direction of magnetization of the two magnets/assemblies 210, 214 have matching directions (e.g., with a positive or North pole at an inlet to the biasing assembly 200 in this example), and, typically, the direction of magnetization may be substantially parallel to the longitudinal axis 221 of the tape 220 and/or its direction of travel 230. The magnetic tape 220 is fed between the top and bottom magnets 210, 214 (e.g., into a tape-containing zone or biasing zone), and the tape 220 is unoriented with a thin magnetic coating/layer 228 on a plastic or similar substrate 224. The magnetic particles 250 are shown at 240 to have magnetic orientations 260 that are somewhat scattered and include perpendicular components (e.g., components transverse to the plane or thickness of the tape 220 or to its longitudinal axis 221).

As the tape 220 is moved as shown at 230 between the magnets 210, 214, it is exposed to a DC magnetic field (e.g., a field up to about 3 times coercivity of layer 228 or the like to fully saturate the layer 228) along its axis 221 that is sufficient to reduce or even substantially eliminate the perpendicular components and align the magnetization 260 of magnetic particles 250 in magnetic coating/layer 228 as shown at 248. The longitudinal bias shown at 248 can be achieved quickly as part of a servo writing operation as the tape 220 may only be very briefly exposed to the magnetic field produced by magnets 210, 214. For example, the magnets 210, 214 may be 0.25 inch-wide permanent magnets or the like and the tape 220 may travel along the path 230 at relatively high rates 4 to 16 meter/second or faster, which places the tape 220 in the biasing zone for only a very small fraction of a second.

Figure 3:
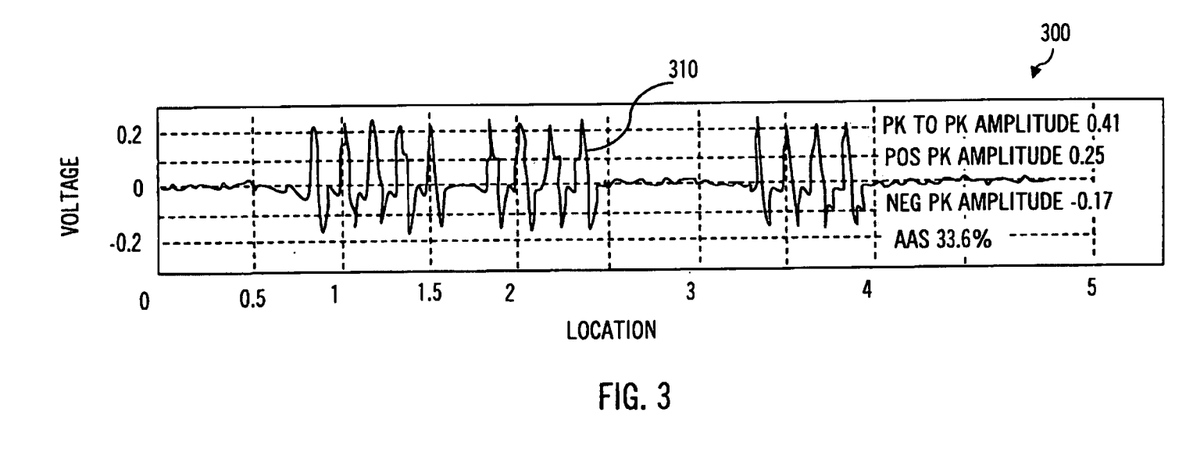
FIGS. 3 and 4 are graphs showing servo signal amplitude for an unoriented tape without magnetic biasing according to techniques described herein and with magnetic biasing according to an embodiment of the invention (e.g., a tape prepared for installation in a cartridge using the servo writer of FIG. 1 or the like)

A single permanent magnet placed on one side of the tape is generally not used within a biasing assembly of the invention because the field lines external to the magnet do not flow in any one direction. FIG. 3 illustrates a graph showing an example of a typical servo pattern output 310 from non- or unoriented tape media but AC-erased that is servo written after single-sided DC erasure. The amplitudes achieved were relatively high/large, but, as can be seen, the servo pattern or signal is asymmetric (e.g., more positive output than negative in this exemplary test), which is undesirable and may even lead to unoriented media not being used in data storage products due to servo control issues.

To facilitate acceptable servo pattern writing, a magnetic bias assembly in accordance with embodiments of the invention typically will use an ensemble of magnets to provide adequate field strength and direction (such as a two, four, or more permanent magnets on opposite sides of a tape path). In one embodiment, a pair of opposing permanent magnets in the shape of a block was used to create a magnetic biasing assembly (although discs and other shapes may be used). The magnets were placed in close proximity to one another (e.g., to provide a biasing zone that allows a tape to pass but provides sufficiently strong magnetic field(s) through which the tape must travel), e.g., less than about 1 inch apart and more typically less than about 0.5 inches such as 0.1 inches or less spacing (with spacing varying with magnet strengths and other parameters). The magnets in this biasing assembly were oriented so that the direction of magnetization was substantially the same for both magnets. In use (such as within a servo writer or for processing of a tape supply for a servo writer), unoriented magnetic tape is passed through the gap between the magnets (e.g., through the biasing zone).

Figure 4:
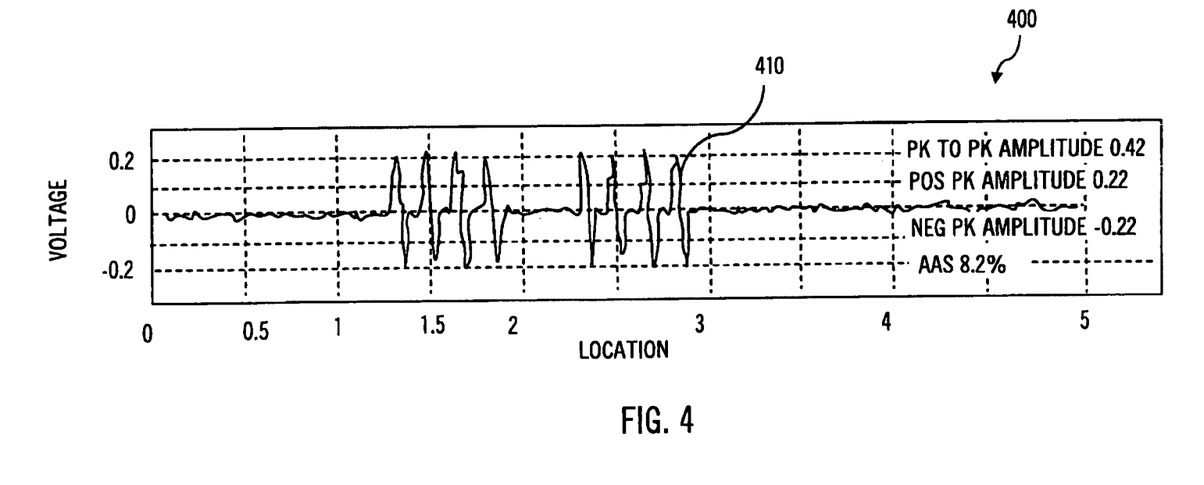

FIG. 4 illustrates a graph showing an example of a servo pattern output 410 from a media that was longitudinally oriented (had a longitudinal magnetic bias applied) prior to writing the servo pattern. Using two magnets in the biasing assembly provided a very large cancellation of fields, which are perpendicular to the longitudinal direction of the tape. As shown, the peak-to-peak amplitude is as large or larger than that found with one-sided DC erasure, e.g., servo writing after providing a longitudinal magnetic bias provides a sufficiently large amplitude in the servo pattern output. Further, though, the servo pattern output is substantially symmetric (e.g., positive peak amplitude and negative peak amplitude are substantially equal (i.e., within 20 percent of each other and more typically within about 10 percent in value). Additionally, the distortion was significantly reduced (e.g., amplitude asymmetry (AAS) was 33.6 percent with the sample shown in FIG. 3 whereas it was 8.2 percent when the unoriented tape was longitudinally biased prior to servo writing as shown in FIG. 4).

Figure 5:
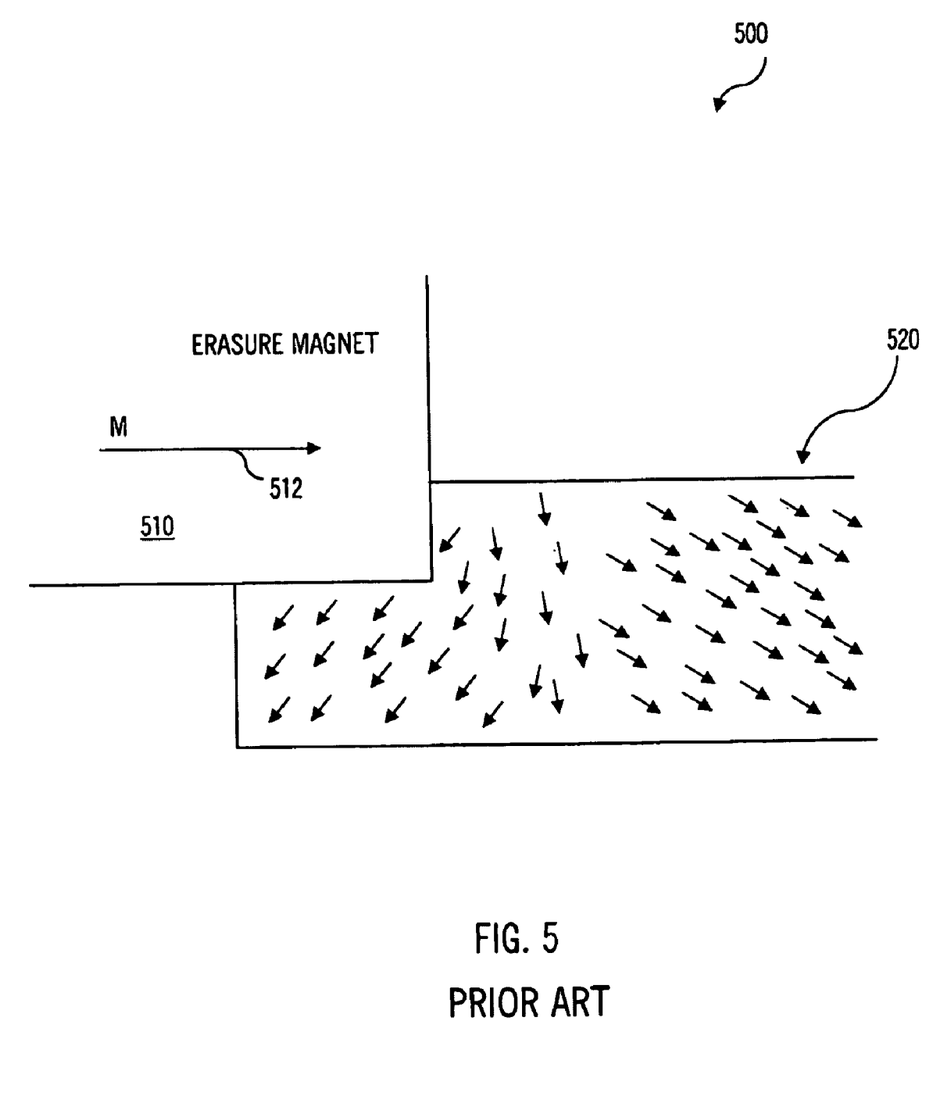
FIG. 5 illustrates a schematic end view of a conventional magnet used for DC erasure of tape showing magnetic field lines proximate to the end of the magnet providing exit or final influences over magnetic coating/layer of a tape.

FIG. 5 illustrates schematically a DC erasure assembly 500 with a single permanent magnet or single DC erasure magnet 510, such as block permanent magnet. The magnet 510 has a magnetization direction shown with arrow 512 and a tape may be passed along the bottom of the magnet 510 generally parallel to the magnetization direction 512. The magnet 510 generates a DC magnetic field 520 with exemplary field lines shown by the numerous arrows, and the field 520 is shown specifically near the edge of the magnet 510 as this edge would likely be positioned at the exit or terminal portion of a DC erasure assembly 500 such that a tape would be exposed lastly to this field 520 to effect the magnetic configuration of the tape. This was not a significant issue with oriented tape media, which was the primary magnetic particle tape media used until the more recent use of unoriented tape media. However, with unoriented tape media, the field 520 is not particularly useful in creating a desirable bias (or preconditioning) for later servo writing. Particularly, as shown, the field lines external to the single magnet 510 are predominantly not in a longitudinal direction with respect to tape travel, and, as such, the field 520 is unsuitable for longitudinally biasing an unoriented tape.

Figure 6:
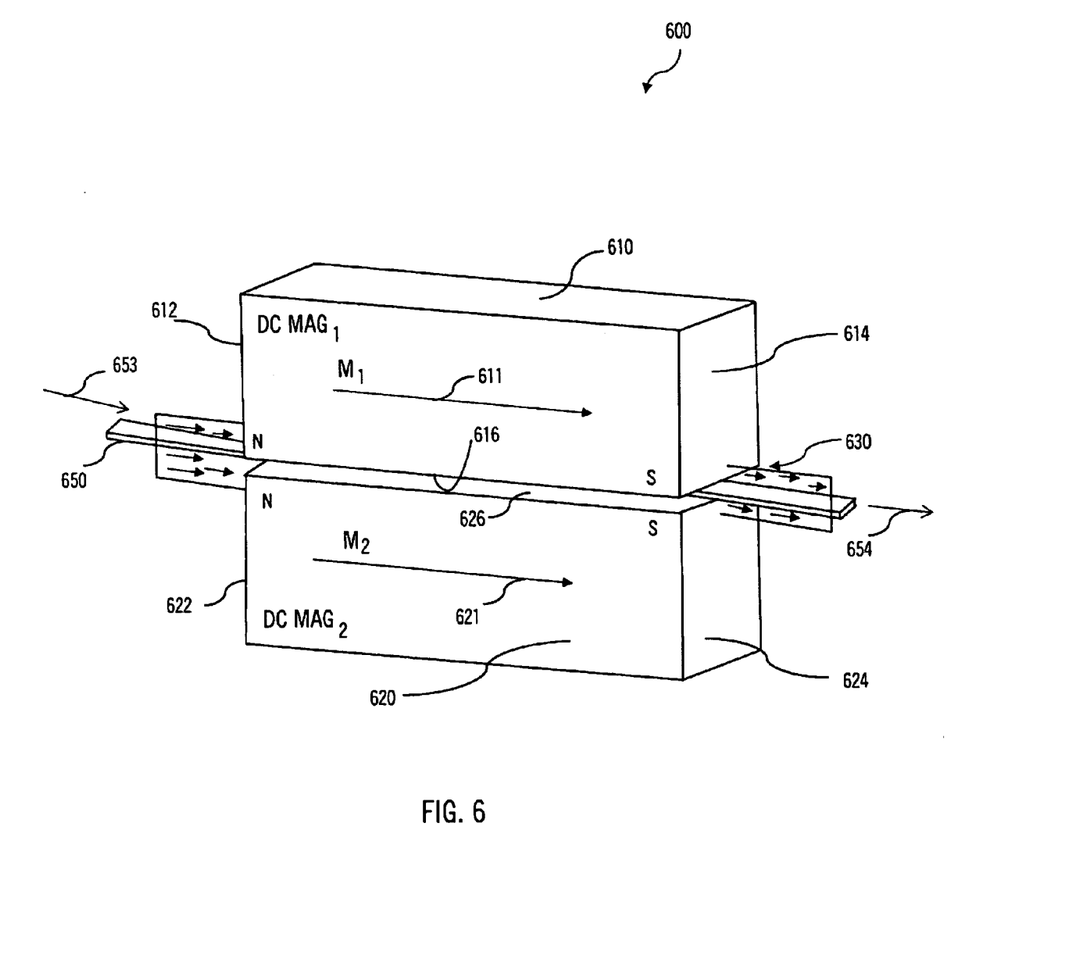
FIG. 6 is a perspective view of a magnetic biasing assembly in accordance with an embodiment of the invention biasing a magnetic tape prior to servo writing.

In contrast, magnetic biasing assemblies that provide two spaced apart magnets (or assemblies of magnets) arranged with their magnetic fields in a substantially common or single direction do provide a DC magnetic field with field lines generally in longitudinal direction, which allows them to bias tape media including reducing the perpendicular component. FIG. 6 illustrates one embodiment of a magnetic biasing assembly 600 useful for biasing an unoriented tape prior to servo writing. As shown, the assembly 600 includes a first or top DC magnet 610 and a second or bottom DC magnet 620. The magnets 610, 620 may be single permanent magnets in a block form, and they are arranged with their direction of magnetization 611, 621 generally being in the same direction (e.g., parallel to each other and an axis of the tape (in some cases) and to the right or in the direction of tape travel shown with arrows 653, 654). This may be achieved, for example, by placing like magnetic poles of the two magnets 610, 620 adjacent each other but separated by the biasing zone.

Such an arrangement results in a strong DC magnetic field 630 being produced in the biasing zone or space between the magnets 610, 620 and, during use, an unoriented tape 650 is passed between the magnets 610, 620 through this biasing zone such that the DC magnetic field 630 is along the axis of the tape 650 (e.g., parallel to, and, typically, in the same direction as the tape travel direction 653, 654. The block magnets 610, 620 include first ends 612, 622 associated with a first magnetic pole (here the N pole but either pole may be provided in this position) and these ends define an inlet end or portion of the assembly 600. The magnets 610, 620 also include second ends 614, 624 associated with a second magnetic pole (here the S pole but again this may be reversed), and these ends 614, 624 define an outlet end or portion of the assembly 600. The magnets 610, 620 also include sides 616, 626 that provide opposing faces of the two magnets 610, 620 that are proximate to the surfaces of the tape 650 (e.g., define the biasing zone or space of assembly 600). The configuration of permanent magnets 610, 620 provides a longitudinal bias in the tape 650 as it passes from ends 612, 622 along surfaces/sides 616, 626, and finally past ends 614, 624. The arrows 611, 621 show the magnetization directions, which in this case are to the right generally in the same direction as each other and as the tape 650 as shown at 653, 654. The DC magnetic field is shown at 630 and during use of assembly 600, the tape 650 is passed from left to right between the magnets 610, 620.

Figure 7:
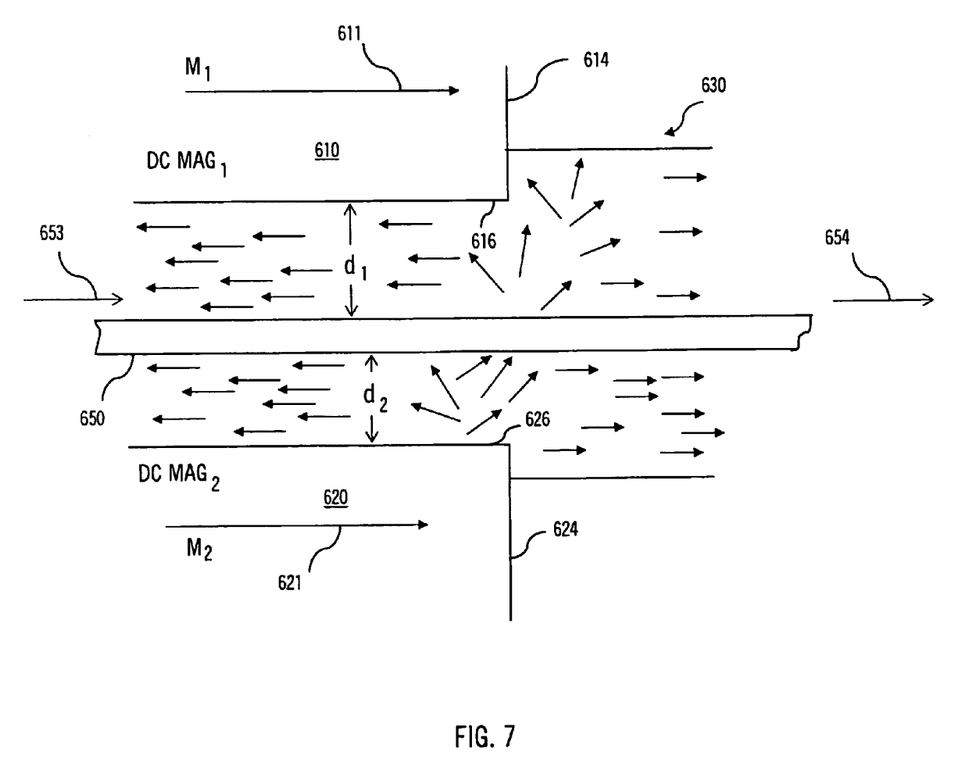
FIG. 7 is an enlarged side view of the assembly of FIG. 6 showing in more detail field strength and direction of the assembly and, particularly, at the exit of the assembly to provide enhanced biasing of an unoriented magnetic tape.

FIG. 7 illustrates the magnetic biasing assembly 600 of FIG. 6 showing an enlarged view of the outlet of the biasing zone near the ends 614, 624 of magnets 610, 620. The tape 650 is shown being fed through the DC magnetic field 630 and out of the assembly, such as for further processing including writing a servo pattern. As shown, the plot of the field strength and direction of the magnetic field 630 between the blocks 610, 620 shows that at the center of the zone or space between the blocks 610, 620 (where the tape 650 typically would travel) the field 630 is predominantly parallel to the faces 616, 626 and there is little or no perpendicular component. At the exit, the fields are generally opposing from the two magnets 610, 620, which provides a generally desirable resultant biasing in the tape 650. In other cases, though, it may be useful to have the distances, $d_1$ and $d_2$, be unequal, such as when one magnet is stronger than the other or when testing shows that it is desirable to have the magnetic surface/layer of tape 650 nearer or farther away from one or the other of the two magnets 610, 620.

In some embodiments, the tape 650 is positioned in the middle of the biasing zone or space between the magnets 610, 620 (e.g., equidistant spacing with a distance, $d_1$, to a first surface of the tape 650 being equal or nearly so to a distance, $d_2$, to a second surface of the tape 650 as measured from inner sides/sidewalls 616, 626). This may be useful when the magnets 610, 620 have about equal strengths (e.g., both are similar magnets with substantially similar magnetic field strengths). Likewise, the surfaces or sides 616, 626 of the two magnets 610, 620 are shown to be equally spaced apart to create a biasing zone with a similar cross section the length of the magnetic biasing assembly 600, but there may be embodiments where the cross section varies over the length of the assembly 600 such as narrowing toward the exit or outlet to create a stronger or differing DC magnetic field to affect a particular biasing result (or widening to create a weaker field to provide another desired affect).

Figure 8:
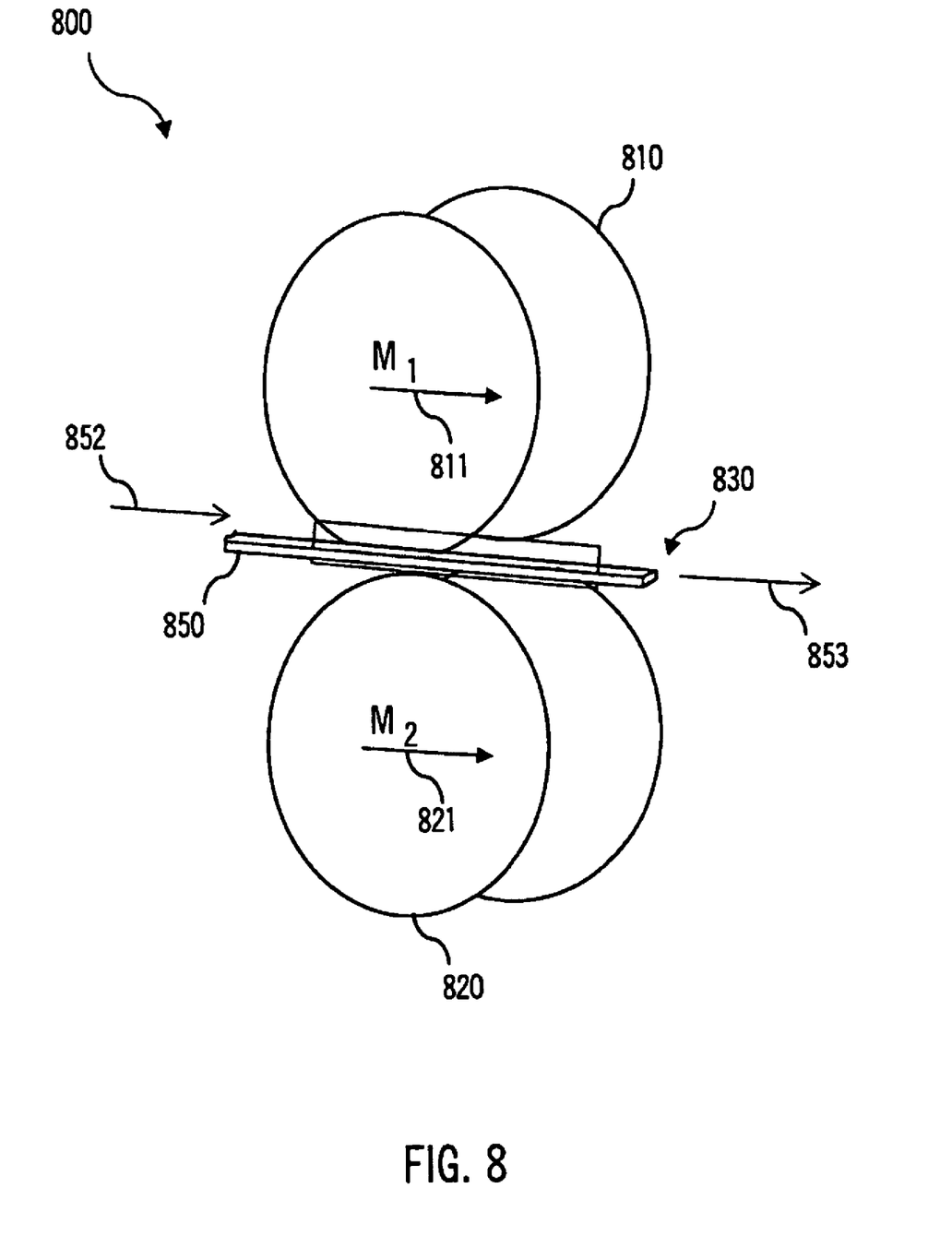
FIG. 8 is a perspective view of a magnetic biasing assembly in accordance with another embodiment of the invention longitudinally biasing a magnetic tape for enhanced servo writing.
Figure 9:
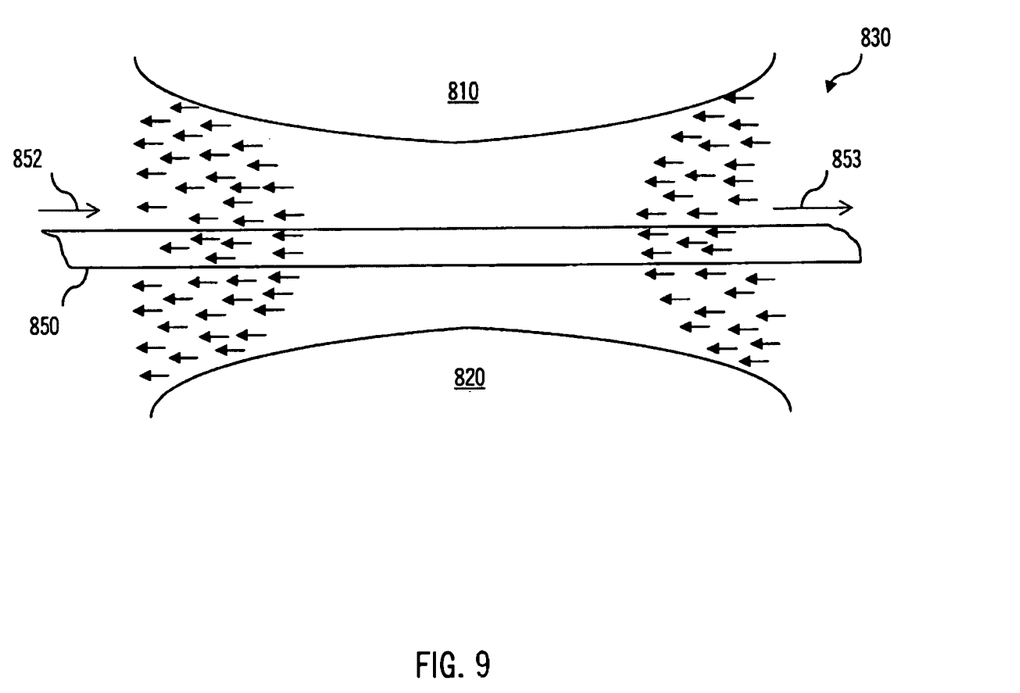
FIG. 9 is an enlarged side view of the assembly of FIG. 8 showing field strength and direction proximate to biasing edges/surfaces of the two opposing disk magnets.

The magnetic biasing assemblies of the invention are not limited to a particular type of magnet or particular shape. For example, FIG. 8 illustrates another biasing assembly 800 that includes a pair of permanent magnets 810, 820 arranged with their magnetization in similar or the same directions 811, 821 (e.g., parallel to and in the same direction as the travel 852, 853 of the tape 850 through the spacing between the two magnets 810, 820). In this configuration 800, the permanent magnets 810, 820 are disk magnets instead of block magnets and generate a DC magnetic field between them (e.g., in a biasing zone) for providing longitudinal bias to the tape 850 as it passes between the magnets 810, 820 (e.g., with its surfaces or sides parallel to the opposing sides or sidewalls of the magnets 810, 820). FIG. 9 shows a plot of the DC magnetic field between disk magnets 810, 820 showing field strength and direction, and the field between the disks 810, 820 is predominantly parallel to the disk magnetization direction but in the opposite direction as shown by the arrows in the biasing zone. There is little or no perpendicular component, which is a desirable result for use in biasing a magnetic layer or coating of the tape 850. The use of disk magnets 810, 820 may be desirable for allowing easier alignment/positioning of the tape 850 between the disks 810, 820 (e.g., there may be more tolerances within the field 830 to provide useful biasing when compared with block magnets).

Figure 10:
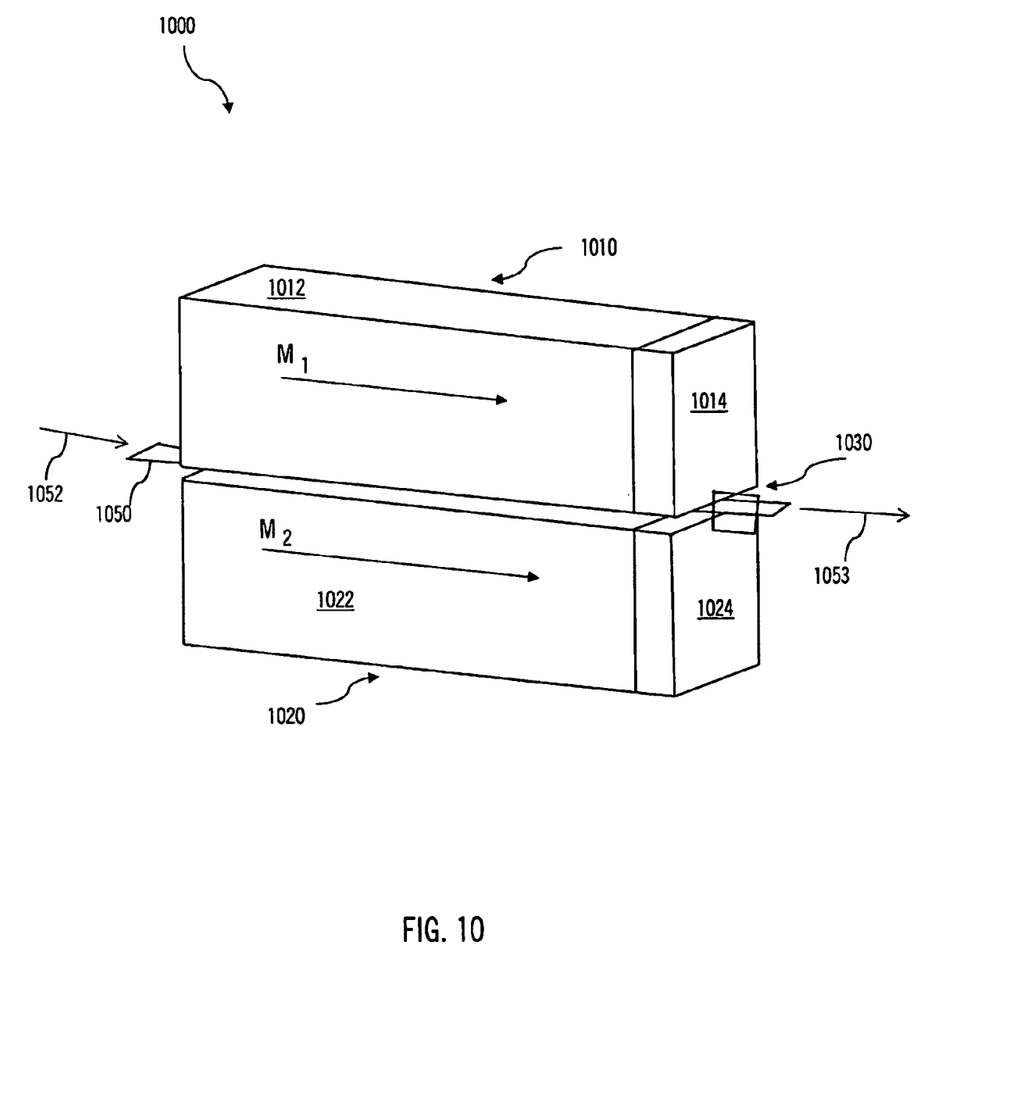
FIGS. 10 and 11 illustrate perspective and enlarged views of another magnetic biasing assembly in accordance with an embodiment of the invention showing use of two magnets/magnetic devices in combination for both the top and bottom DC magnet assemblies (e.g., rather than using one block, disk, electro, or other magnet for each of these magnets).
Figure 11:
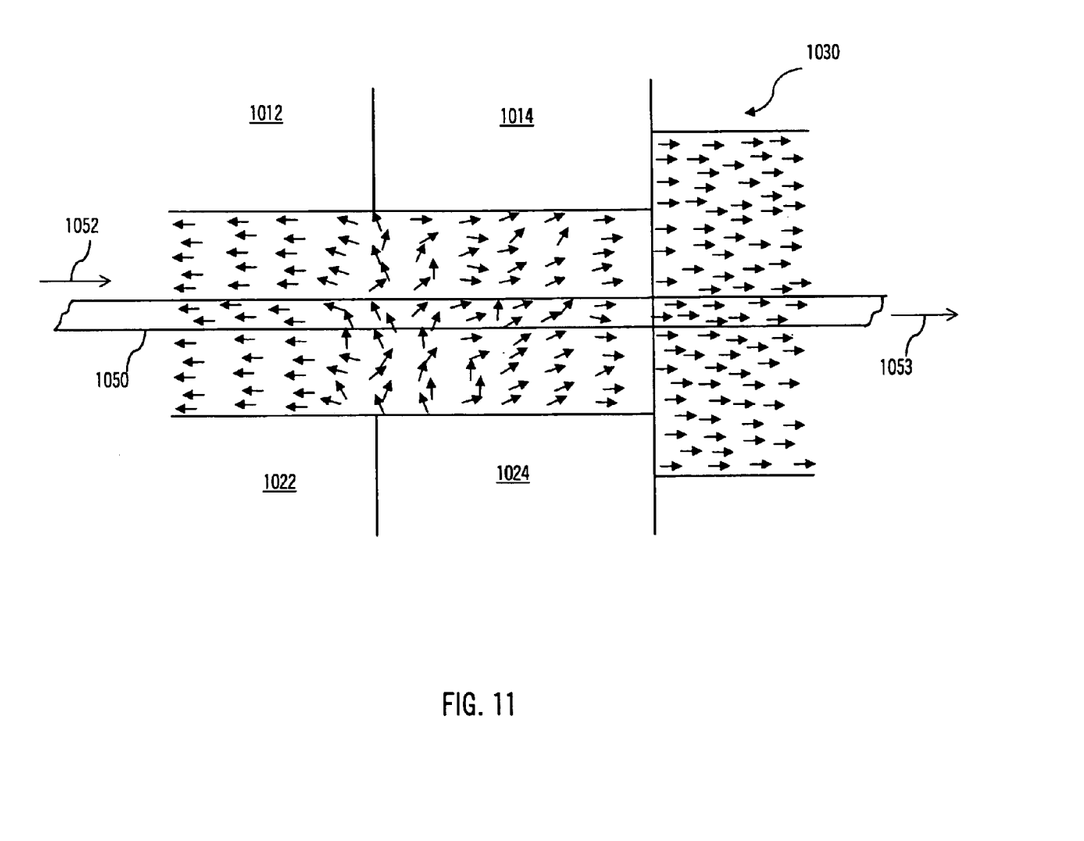

In addition to varying the shape of the magnets of a biasing assembly, the longitudinal bias of tape media may be achieved by providing more than one magnet or magnetic device in one or both the top and bottom magnet or magnet assemblies. For example, FIGS. 10 and 11 illustrate a magnetic biasing assembly 1000 in which a DC magnetic field 1030 is formed for creating a longitudinal bias in a tape 1050 traveling as shown at 1052, 1053. The field 1030 is formed by providing a first or top magnetic assembly 1010 and a second or bottom magnetic assembly 1020. Each assembly 1010, 1020 includes two magnets or magnetic devices, and, in this example, each assembly 1010, 1020 includes a block permanent magnet 1012, 1022 combined with a magnetic device 1014, 1024 formed of magnetically soft material. The assemblies 1010, 1020 have directions of magnetization that are the same (e.g., parallel to each other and to the right in this case), which may match the direction 1052, 1053 of travel of the tape 1050. In other embodiments, more magnetic devices may be utilized in the assembly 1010 and/or assembly 1020 and such devices may be permanent magnets, electromagnets, or including magnetically soft material and may be of differing shapes (e.g., pair a disk magnet with a block magnet and/or with magnetically soft material).

The assemblies 1010, 1020 each provide, in one embodiment, a configuration of a permanent block magnet 1012, 1022 and a magnetically soft block 1014, 1024. The use of magnetically soft blocks at (or to define) the exit or outlet of the biasing zone/biasing assembly 1000 serve to modify the field 1030 at the permanent magnet perimeter to further reduce perpendicular components in the field 1030 (which may detrimentally effect the biasing of the unoriented magnetic layer/coating of tape 1050). FIG. 11 shows in more detail the DC magnetic field provided near the tape 1050 or along its longitudinal axis as it travels between the assemblies 1010, 1020. As shown, there is a marked contrast between field lines achieved in the field 1030 and provided in the field 630 shown in FIG. 6 for the assembly 600 that only included permanent block magnets 610, 620, and it can be seen that the field 1030 just past the ends of the soft magnetic blocks 1014, 1024 has only minimal perpendicular components with nearly all field direction lines being parallel to the tape surfaces. Such a field 1030 may be desirable in some biasing applications to prepare an unoriented tape media for servo writing. Of course, the soft magnetic blocks 1014, 1024 are not required in all applications, and the field 1030 may readily be varied by selection and/or design of the blocks 1014, 1024 (e.g., to increase/decrease their size, their strength, and so on) and/or selection and/or design of the permanent magnets 1012, 1022 (e.g., to use disk magnets, to increase their size and/or strength, and so on).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. Electromagnets may be used in place of or in addition to the permanent magnets or the soft magnetic material blocks shown in the figures. For example, the first and second magnets 134, 138 shown in FIG. 1 in magnetic biasing assembly 130 may be electromagnets. Use of electromagnets as biasing elements or heads may be achieved by providing a conductor wound into a finite solenoid. The magnetic tape may then be passed through the center of the solenoid where the fields are primarily longitudinal (e.g., this center may be the biasing zone for unoriented magnetic tape media).

Another approach may be to use two solenoids filled with magnetically soft material. The resulting configuration is then similar to the permanent magnet structures described herein. An advantage of using an electromagnet in a magnetic biasing assembly is that the field strength can be adjusted by varying the electrical current. A combination of both electromagnets and permanent magnets could also be used. In such embodiments, which may be illustrated according to FIG. 10, the permanent magnets 1012, 1022 may provide the bulk of the field necessary to orient or bias the media, while the electromagnets 1014, 1024 may be used to provide additional field strength and field shaping as necessary or desired for a particular application.

We claim:

1. A method of servo writing a magnetic tape media, comprising:

providing a supply of tape media comprising a magnetic layer on a substrate, wherein magnetic particles in the magnetic layer are physically unoriented in relation to a longitudinal axis of the tape media;

defining a biasing zone comprising a DC magnetic field generated within the biasing zone, wherein the biasing zone is formed between a first magnetic assembly and a second magnetic assembly spaced apart a distance from the first magnetic assembly, the directions of magnetization of the first and second magnetic assemblies being substantially in a single direction; and feeding the tape media through the biasing zone forming a longitudinal magnetic bias in the magnetic layer of the tape media, wherein the magnetic particles in the magnetic layer remain physically unoriented in relation to the longitudinal axis of the tape media.

2. The method of claim 1, wherein the DC magnetic field is substantially free of perpendicular components and wherein the method further comprises using a write head to write a servo pattern to the tape media after the feeding of the tape media through the biasing zone.

3. The method of claim 1, wherein the first magnetic assembly comprises a permanent block magnet and the second magnet assembly comprises a permanent block magnet, the biasing zone being defined by two spaced apart sidewalls of the block magnets and wherein like poles of the block magnets are adjacent but spaced apart by the biasing zone.

4. The method of claim 3, wherein the first and second magnetic assemblies each further comprises a block of magnetically soft material adjacent the block magnet and wherein the blocks of magnetically soft material modify a portion of the DC magnetic field proximate to an outlet of the biasing zone.

5. The method of claim 1, wherein during the feeding of the tape media through the biasing zone the DC magnetic field has a direction that is substantially parallel to a longitudinal axis of the tape media and the method further comprising after the feeding, writing a servo pattern to the magnetic layer, the servo pattern providing an output that is substantially symmetric.

6. A servo writer for use with unoriented magnetic tape, comprising:

a write head for writing a servo pattern on magnetic tape;

a tape path defined between a supply and a written-product reel of tape; and a magnetic biasing assembly positioned in the tape path upstream of the write head, the magnetic biasing assembly comprising a pair of magnet assemblies oriented with like directions of magnetization and with a gap between the magnet assemblies for receiving unoriented magnetic tape traveling on the tape path, wherein the directions of magnetization of the pair of magnet assemblies match the direction of travel of the unoriented magnetic tape through the gap, and wherein the unoriented magnetic tape includes a magnetic layer on a substrate, the magnetic layer having magnetic particles that are not physically oriented in relation to a longitudinal axis of the unoriented magnetic tape during manufacture of the unoriented magnetic tape.

7. The servo writer of claim 6, wherein each of the magnet assemblies comprises a permanent magnet and wherein a DC magnetic field is formed in the gap between the permanent magnets.

8. The servo writer of claim 7, wherein the DC magnetic field is substantially parallel in direction to the unoriented magnetic tape traveling through the gap.

9. The servo writer of claim 7, wherein each of the magnet assemblies further comprises a portion comprising soft magnetic material adjacent to the gap and downstream along the path from the permanent magnet.

10. The servo writer of claim 7, wherein each of the magnet assemblies further comprises an electromagnet.

11. The servo writer of claim 10, wherein the permanent magnets provide a substantially larger component of the DC magnetic field formed in the gap than the electromagnets.

12. The servo writer of claim 6, wherein the write head is operated to write a servo pattern on the magnetic tape after it passes through the gap, whereby a longitudinal magnetic bias is provided on the magnetic tape and wherein an output of the written servo pattern is symmetric.

* * * * *